United States Patent
Atkin

(10) Patent No.: US 7,760,264 B2
(45) Date of Patent: Jul. 20, 2010

(54) METHOD OF OBTAINING AN IMAGE

(75) Inventor: Philip Atkin, Haslingfield (GB)

(73) Assignee: Synoptics Limited, Cambridge (GB)

( * ) Notice: Subject to any disclaimer, the term of this patent is extended or adjusted under 35 U.S.C. 154(b) by 1047 days.

(21) Appl. No.: 10/038,569

(22) Filed: Jan. 2, 2002

(65) Prior Publication Data
US 2002/0186305 A1 Dec. 12, 2002

(30) Foreign Application Priority Data
Jan. 3, 2001 (EP) .................................. 01300025

(51) Int. Cl.
*H04N 5/235* (2006.01)
*G03B 7/00* (2006.01)
(52) U.S. Cl. ................. 348/362; 348/221.1; 348/229.1; 348/222.1
(58) Field of Classification Search ................. 348/362, 348/221.1, 222.1, 229.1, 364
See application file for complete search history.

(56) References Cited

U.S. PATENT DOCUMENTS

| | | | | |
|---|---|---|---|---|
| 4,590,582 | A * | 5/1986 | Umemura | 708/308 |
| 5,033,096 | A * | 7/1991 | Morrison et al. | 382/152 |
| 5,309,243 | A | 5/1994 | Tsai | 348/221 |
| 5,801,773 | A * | 9/1998 | Ikeda | 348/229.1 |
| 5,828,793 | A * | 10/1998 | Mann | 382/284 |
| 7,209,166 | B2 * | 4/2007 | Krymski | 348/221.1 |

FOREIGN PATENT DOCUMENTS

| EP | 0 387 817 A2 | 9/1990 |
|---|---|---|
| WO | WO 00/78038 | 12/2000 |

* cited by examiner

*Primary Examiner*—Yogesh K Aggarwal
(74) *Attorney, Agent, or Firm*—Fletcher Yoder PC

(57) ABSTRACT

A method of creating an image 4 obtained from say a camera 1 to obtain a substantially linear representation of the brightness of the image includes, for each of a set of pixels (x, y) in a two dimensional array, calculating, in a computer 3, an estimate of the true image intensity ($i_{xy}$) as a weighted average of n samples of the apparent image intensity ($v_{n,xy}$). This is calculated as:

$$\hat{i}_{xy} = \frac{\sum_n \left(w_{n,xy}\left(\frac{v_{n,xy} - C}{KT_n}\right)\right)}{\sum_n w_{n,xy}} = \frac{1}{K}\frac{\sum_n \left(w_{n,xy}\left(\frac{v_{n,xy} - C}{T_n}\right)\right)}{\sum_n w_{n,xy}}$$

where $v_{n,xy}$ is the apparent intensity measured, $T_n$ is the exposure time, K is the gain of the system, C is an offset and $w_{n,xy}$ is a weighting factor which is defined to maximize the signal to noise ratio and discard insignificant, that is saturated or near zero, values. Thereafter each of the values $\hat{i}_{xy}$ is saved together with other data representing the image 4, before the image is output to a display 5 or to a printing device.

4 Claims, 1 Drawing Sheet

METHOD OF OBTAINING AN IMAGE

BACKGROUND

The present invention relates to a method of obtaining an image and, more particularly, a method of obtaining a substantially linear representation of the brightness of an image having a wide dynamic range.

Digital electronic cameras and other similar imaging devices and systems often use CCD (charge coupled device) sensors, and work by converting incident photons into charge and accumulating the charge in each pixel for the duration of the exposure. Like all other imaging devices, including conventional wet photography and other digital systems, such imaging devices impose limits on the dynamic range of the signal they can capture. In particular, image details in the regions which are either too dark or too bright cannot be captured. In such digital devices, the charge in each cell on to which part of an image is imposed, is read out and converted into a number representing its intensity or brightness via an analogue to digital converter. Therefore, if the image is too bright, or the exposure time is too long, then saturation occurs and the brightness of the image is clipped to the maximum representable intensity and no detailed information is available in these areas. This imposes an upper limit on the detected brightness. Conversely, if the image is too dark any signal is indistinguishable above the quantisation noise in the analogue to digital converter and therefore detail is lost in these dark areas.

An important characteristic of this clipping process is that it is destructive and destroys information which cannot subsequently be recovered from the recorded image. Therefore any attempt to capture the information that would otherwise be missing, must be made at the time of capture of the image. The resulting image requires a wider dynamic range than that of the basic sensor and analogue to digital converter. It is possible, then, to correct overall over or under exposure by adjusting the time over which the sensor is accumulating charge so that the full dynamic range of the digital imaging system is utilised. However, whilst this uses the available dynamic range to best effect, it cannot assist where there are both very bright and very dark regions, for example, in an electrophoresis gel, in the same field of view as both lengthening and reducing the exposure time cannot be carried out simultaneously. In these circumstances it is possible to capture either the bright areas or the dark areas accurately, but not both simultaneously.

Now, it is evident that, under such circumstances, a series of images captured using different exposure times will contain all of the available information. Indeed a technique well known in the art involves simply averaging together a series of images recorded with steadily increasing exposure times. This can be shown to result in an image which is approximately proportional to the logarithm of the intensity. Such a result may be pleasing to the eye in that very bright regions do not suppress the detail of very dark regions, but such images lack the crucial linear quality often required for quantitative analysis.

It is possible to obtain camera systems having an inherent high dynamic range and whose output can be digitised to a 16 bit resolution. Such systems can achieve the dynamic range necessary to image both very dark and very light areas without saturation, but they are both very expensive and generally slow to operate with regard to focussing and adjusting the field of view. The advantages of the present invention are that an inexpensive sensor and digitizer may be used, and the readout can be rapid, facilitating convenient, fluid adjustment of focus.

The ideal digital output $i_{xy}$ from an analogue to digital converter of a true image of intensity $i_{xy}$ is given by $$v'_{xy} = KTi_{xy} + C$$

where T is the exposure time, K is the overall gain of the system, and C is an offset. However, due to the saturation at the high and low ends of the range the true output $i_{xy}$ is constrained by:

$$v_{xy} = \begin{cases} KTi_{xy} + C & v_{min} < v'_{xy} < v_{max} \\ v_{max} & \text{when } v'_{xy} \geq v_{max} \\ v_{min} & v'_{xy} \leq v_{min} \end{cases}$$

In order to reduce the effects of noise an average over a series of images with different exposure times $T_n$ can be taken, giving a superior estimate of the true image $i_{xy}$:

$$\hat{i}_{xy} = \frac{1}{n} \sum_n \left( \frac{v_{n,xy} - C}{KT_n} \right)$$

Averaging of this kind is well known in the art but it does not resolve the problem of saturated areas and dark areas and therefore the present invention discards the values for these pixels from the average, such that only pixels having significant values, that is those well away from the dark and light limits, are considered when averaging the images together.

The present invention is aimed at overcoming the shortcomings of the prior art methods.

SUMMARY OF THE INVENTION

According to the present invention there is provided a method of creating an image which includes the steps of:

obtaining a substantially linear representation of the brightness of an image, the method comprising, for each of a set of pixels (x, y) in a two dimensional array, calculating an estimate of the true image intensity ($\hat{i}_{xy}$) as a weighted average of n samples of the apparent image intensity ($v_{n,xy}$) as $$\hat{i}_{xy} = \frac{\sum_n \left( w_{n,xy} \left( \frac{v_{n,xy} - C}{KT_n} \right) \right)}{\sum_n w_{n,xy}} = \frac{1}{K} \frac{\sum_n \left( w_{n,xy} \left( \frac{v_{n,xy} - C}{T_n} \right) \right)}{\sum_n w_{n,xy}}$$

where $v_{n,xy}$ is the apparent intensity measured, $T_n$ is the exposure time, K is the gain of the system, C is an offset and $w_{n,xy}$ is a weighting factor which is defined to maximise the signal to noise ratio and discard insignificant, that is saturated or near zero, values;

thereafter saving each of the values $\hat{i}_{xy}$ together with other data representing the image; and outputting the image to a display or to a printing device or to a subsequent analysis.

For example, in the most simplistic case:

$$w_{n,xy} = \begin{cases} 1 & v_{min} < v_{n,xy} < v_{max} \\ 0 \text{ when} & v_{n,xy} \geq v_{max} \\ 0 & v_{n,xy} \leq v_{min} \end{cases}$$

A further example is that of Gaussian noise which is minimised, and hence the signal to noise ratio is maximised, when $$\frac{w_{n,xy}}{KT_n} = 1$$

and therefore $$w_{n,xy} = \begin{cases} KT_n & v_{min} < v_{n,xy} < v_{max} \\ 0 \text{ when} & v_{n,xy} \geq v_{max} \\ 0 & v_{n,xy} \leq v_{min} \end{cases}$$

The invention provides for an image to be formed over a wider dynamic range than that of the basic sensor and A to D converter and enables the image to be a linear representation of the brightness of the original scene whilst taking into account all the available data and with an optimal signal to noise ratio. It also allows an image series to be captured automatically to cover a wide range of exposure times as the number of saturated and zero output pixels is a natural output from each step, so that the sequence can be chosen to cover the entire dynamic range of the specimen automatically rather than arriving, by iteration, at the optimal single exposure time for the whole specimen which is the technique currently employed in the art.

The input image from the camera may be of any precision. Typically it would be 8, 12, or 16 bits/pixel. In order that any of these forms can be processed the algorithm can be coded such that each of these forms is converted to a high precision or floating point format before further processing.

The choice of the exposure times $T_n$ is very important. For practical cameras, the exposure time is subject to limits and not all exposure times are possible within those limits. As part of the implementation of the present invention, it is required to determine those pixels which are saturated. The operation of a system incorporating the invention can be broken down into three phases: adjustment, capture and analysis. By counting those pixels which are saturated and those for which there is a zero output for a particular frame, the implementation can determine whether the frame is generally over or under exposed. During the adjustment phase, the best single exposure time for the specimen is selected. This selection process is either performed manually via viewing unmodified digital image directly on screen or automatically from the frequency histogram of the intensity levels of the image.

As the exposure time is varied, the number of pixels at the limits may be monitored. If the exposure time is reduced to a point where no pixels are saturated then there is no more information to be obtained by any further reduction in exposure time. Similarly, if the exposure time is increased to the point where most pixels are saturated there is little point in any further increase. In the presence of noise, it may be worth going a little beyond each of these limits so as to increase the number of valid samples for the averaging.

This approach can be subject to two problems: sometimes the ratio between the successive exposure times is not precisely known and there is often an offset present in the camera electronics or in the analogue to digital converter which results in a further offset to each image.

In order to resolve these difficulties a regression calculation can be performed between successive pairs of images in order to determine the linear function relating them. Given this relationship, each image can be transformed to match the scale and offset of the other. For unsaturated pixels there is a linear relationship between the images recorded at different exposure times, where the gradient is the ratio of the two exposure times and the offset is a constant for all pixels.

For example if one considers:

$$v'_{m,xy} = KT_m i_{xy} + C$$

and $$v'_{n,xy} = KT_n i_{xy} + C$$

these can be re arranged as:

$$v'_{m,xy} = \frac{T_m}{T_n} v'_{n,xy} + C - C\frac{T_m}{T_n}$$

which is of the linear form:

$$v'_{m,xy} = av'_{n,xy} + b$$

So, for unsaturated pixels, there is a linear relationship between the images recorded with different exposure times, where the gradient a is the ratio of the two exposure times and the offset b is a constant for all pixels. The situation is slightly complicated by the presence of noise in both the $v_m$ and $v_n$ images and the best fit linear relationship in this case is given by a perpendicular regression, which minimises the sum of the squares of the perpendicular distance between a point formed by the coordinates $(v_{n,xy}, v_{m,xy})$ and the fitted linear relationship.

An example of an implementation of a standard perpendicular regression technique that accounts for the possibility of saturated pixels is the following pseudocode:

```
s = sL = sn = sm = snn = smm = snm = 0
for all y values of image
{
    for all x values of image
    {
(vn is intensity value of image n at x,y and vm is intensity value
of image m at x,y)
        if vn > vmin AND vn < vmax AND vm > vmin AND
        vm < vmax
        {
        s = s + 1
        sn = sn + vn
        snn = snn + (vn*vn)
        sm = sm + vm
```

-continued

```
            smm = smm + (vm*vm)
            snm = snm (vn*vm)
        }
        else
        {
            sL = sL + 1
        }
    }
}
sdndndmdm = snn (sn * sn / s) snm + (sm * sm/s)
sdndm = snm (sn * sm/s)
aa = sdndndmdm/sdndm
a = ( aa + SquareRoot(aa * aa + 4))/2
b =(sm a * sn)/s
```

In this way the linear relationship between one image and another may be determined. This is best done between one image and the next in the series, because, in this way, the number of spatial locations (x,y) whose intensity is not saturated in either image, is maximised, resulting in the best statistics and the most accurate estimate of a and b.

As a by product, sL is the number of pixels which is saturated in at least one of the images.

Having determined a and b, each image can be transformed to match the scale and offset of the first in the series. The expression for the averaging kernel is then:

$$\hat{i}_{xy} = \frac{\sum_n \left( w_{n,xy} \left( \frac{v_{n,xy} - \sum_n b_n}{\prod_n a_n} \right) \right)}{\sum_n w_{n,xy}}$$

where $a_n$ and $b_n$ are the gradient a and offset b measured between image n and image n 1 ($a_1=1$; $b_1=0$), where:

$$w_{n,xy} = \begin{cases} a_n & v_{min} < v_{n,xy} < v_{max} \\ 0 \text{ when } & v_{n,xy} \geq v_{max} \\ 0 & v_{n,xy} \leq v_{min} \end{cases}$$

$v_{min}$ and $v_{max}$ may be conveniently expressed as fractions of the total data range of the camera and therefore these parameters do not need to be altered for different cameras.

When processing an image with either the shortest or the longest exposure time of the series, the processing may be slightly different. For the shortest exposure even pixels above $v_{max}$ can be included in the calculations because no other, longer exposure, is going to yield a better representation of the brightness of the pixel. Similarly, for the longest exposure, even pixels that are below $v_{min}$ can be included. If this were not the case then no data on these pixels would be obtained at any time during the process. Such pixels should not, however, be used to calculate the relative gain and offset between the image and its predecessor.

Furthermore, it is possible to use the system to process colour images. The relative gain is the same for each colour band because it represents the ratio of the exposure times and thus is calculated for all colours together. However, the offset is colour dependent and must be calculated by processing each colour band separately.

BRIEF DESCRIPTION OF THE DRAWINGS

One example of a system constructed in accordance with the present invention will now be described with reference to the accompanying drawing, in which.

DETAILED DESCRIPTION OF THE PREFERRED EMBODIMENT

Figure 1:
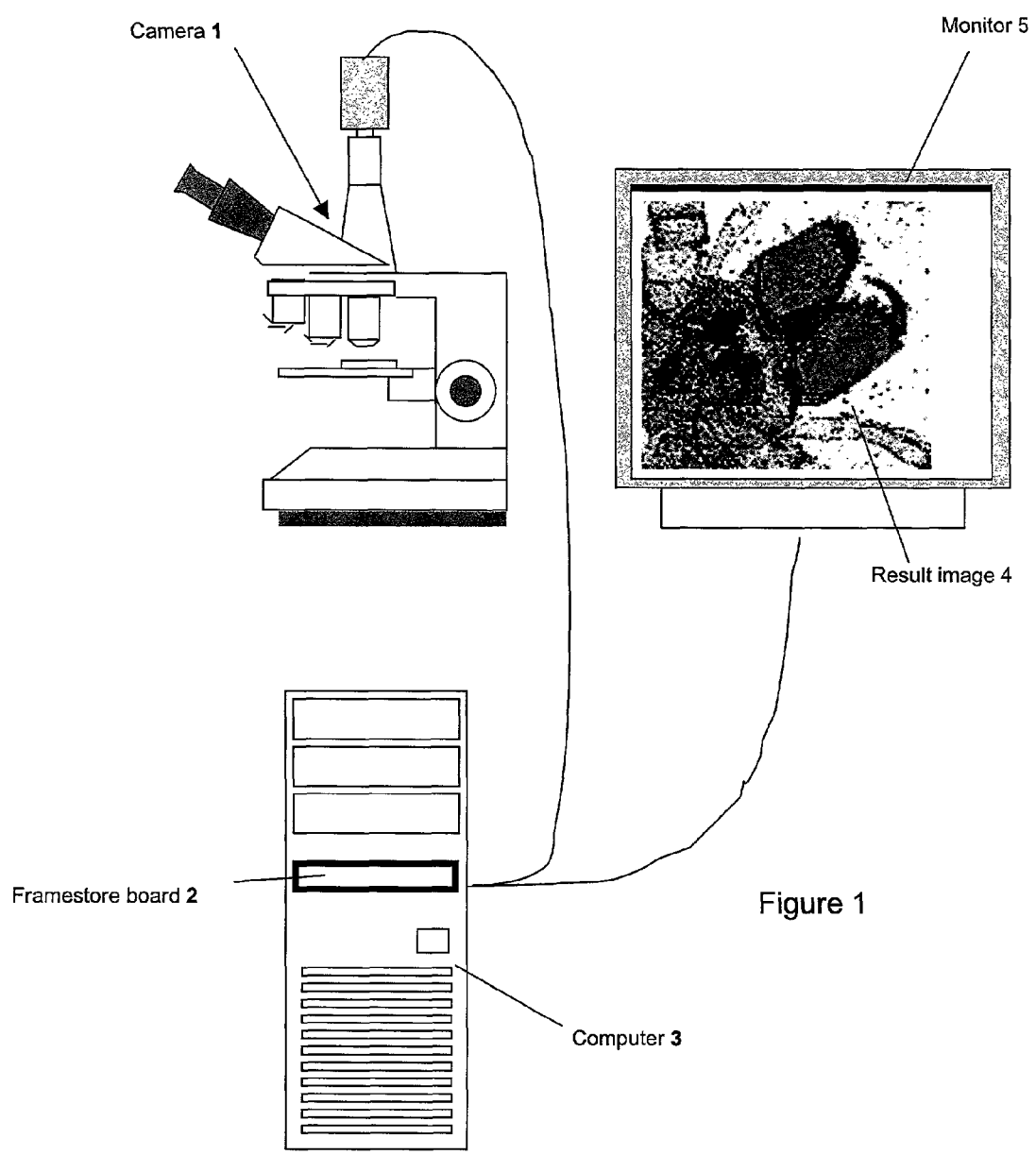
FIG. 1 is a general view of the apparatus.

The system as implemented in the example includes a camera 1 (in the particular example, a JVC KY F50E camera). The camera 1 output signals are digitized by analogue to digital converters which form part of a framestore board 2 (a Synoptics Prysm framestore) fitted within a personal computer 3 (a Gateway 2000 PC with a 500 MHz Pentium II processor and 256 MB RAM running Windows 98) and then the digital image 4 is placed in the computer s memory and may be displayed on a monitor 5.

Thereafter the brightness values $\hat{i}_{xy}$ for each pixel are calculated in accordance with the expressions above.

Control of the system was achieved using software written in Visual Basic and C++ using Synoptics Image Objects to handle the display and processing functions.

In operation, firstly, during the adjustment phase the best single exposure time for the specimen object is selected. Although the selection may be performed by the user it is preferable that it is determined automatically from the occurrence frequency histogram of the intensity levels of the image. Thus, if more than a predefined number of pixels exceed a predefined intensity, generally $v_{max}$, then the image is considered too bright to form the starting point and the process is repeated with a shorter exposure time. Conversely, if more than a predetermined number of the pixels have an intensity less than $v_{min}$ then the image is considered too dark and the exposure time is increased. If the process is repeated more than a predefined number of times without an appropriate image being acquired, then the algorithm can be aborted with an error report.

Thereafter, during the capture phase a number of steps are under taken according to the present invention. First, areas of computer memory are located for the values needed during the process corresponding to:

$$\sum_n \left( w_{n,xy} \left( \frac{v_{n,xy} - \sum_n b_n}{\prod_n a_n} \right) \right) \text{ and } \sum_n w_{n,xy}$$

The data in these memory areas is stored in high precision format in order to avoid data degradation due to rounding or truncation.

The exposure time selected during the adjustment phase is then used as a starting point. An image is acquired using this exposure time. For this image, a is taken as 1 and b as zero, w is 1 for those pixels having an in range value and zero otherwise, and the summations identified above are initialised with the values indicated. The exposure time is then increased by approximately a factor of 2, and another image acquired.

For each new image the following processes are carried out:

the image is compared to the previous one acquired to determine the linear relationship between the gradient a and offset b, considering only those spacial pixel locations in which the intensities in both images are well away from the limits $v_{min}$ and $v_{max}$;

the product of all the a values, and a sum of all the b values, is computed;

for each pixel location in which the new image of intensity value is within range, the values in the two formations given above are updated; (w is equal to the product of all the a values for those pixels having an in range value, and zero otherwise)

if the number of spatial locations for which the new image s intensity value exceeds $v_{max}$ is greater than a predetermined percentage of all spatial locations in the image, then there is little point in increasing the exposure time further.

This process can be repeated to resume for the same starting exposure time but decrease in the exposure time for each iteration until more than a given percentage of the spatial locations have an intensity less than $v_{min}$. Finally, the ratio of the two accumulation values is calculated to form a result image. This image may be subject to a linear resealing or offset to make it suitable for conversion to a fixed point format image for further processing.

Although the linear image is very useful for processing and analysis it can be difficult to view the image on a conventional display with a much lower dynamic range. Therefore after the extended dynamic range image has been created it can be useful to process the data further in order to view it conveniently on a display medium with a more limited dynamic range. Two methods have been employed, the first of which is histogram equalization. This technique can be applied to an entire image or to a smaller neighbourhood within the image. The technique considers the frequency histogram of the intensity levels in the result images and alters the brightness levels in the image so as to achieve a desired distribution of intensity levels. The effect is that a range of intensity levels that contains much information, and therefore many pixels within that intensity range, is spread out to enhance the contrast in that range whereas the thinly populated range of intensity levels is compressed. This technique can be used to compress an image with high dynamic range into another suitable for direct display, with little loss of information. A variation that is useful when dealing with colour image sources, is to arrange for the hue of each pixel to remain constant as its brightness is adjusted. This prevents unnatural colour casts from occurring.

An alternative technique for displaying the information on a conventional display with a reduced dynamic range is local contrast enhancement. This technique boosts contrast in areas with little detail, and compresses contrast in areas with much detail. It can also darken generally light areas and vice versa in order to normalise the brightness and contrast of each neighbourhood of pixels. The resultant image has a uniform level of detail throughout the image. When processing colour images it is necessary, as with the histogram equalisation technique, to maintain a constant hue.

What is claimed is:

1. A method of creating an image which includes the steps of:

obtaining a representation of the brightness of an image, said representation being linear over the whole range of brightness, by calculating, for each of a set of pixels (x, y) in a two dimensional array, an estimate of the true image intensity ($i_{xy}$) as a weighted average of n samples of the apparent image intensity ($v_{n,xy}$) as $$\hat{i}_{xy} = \frac{\sum_n w_{n,xy} \left( \frac{v_{n,xy} - \sum_n b_n}{\prod_n a_n} \right)}{\sum_n w_{n,xy}}$$

where $a_n$ and $b_n$ are the gradient a and offset b measured between image n and image n−1 ($a_1$=1; $b_1$=0) when $$w_{n,xy} = \begin{cases} \prod_n a_n & v_{min} < v_{n,xy} < v_{max} \\ 0 & \text{when} \quad v_{n,xy} \geq v_{max} \\ 0 & v_{n,xy} \leq v_{min} \end{cases}$$

where $v_{n,xy}$ is the apparent intensity measured, n is greater than or equal to 2, and $v_{min}$ and $v_{max}$ are defined to maximize the signal to noise ratio and discard insignificant, that is saturated or near zero, values;

thereafter saving each of the values $i_{xy}$ together with other data representing the image; and outputting the image to a display or to a printing device.

2. A method according to claim 1, wherein the gradients a and the offsets b are obtained by the use of a regression technique whereby each image is transformed to match the scale and offset of the first in the series.

3. A method according to claim 1 or claim 2, wherein the image is a coloured image and the offset is colour dependent.

4. A method according to claim 2, wherein the regression is a perpendicular regression.

* * * * *